United States Patent
Coneron et al.

(10) Patent No.: US 12,478,005 B2
(45) Date of Patent: Nov. 25, 2025

(54) DEVICE FOR COLLECTING GARDEN DEBRIS

(71) Applicants: James Coneron, Ascot (GB); Sally-Anne Coneron, Ascot (GB)

(72) Inventors: James Coneron, Ascot (GB); Sally-Anne Coneron, Ascot (GB)

( * ) Notice: Subject to any disclaimer, the term of this patent is extended or adjusted under 35 U.S.C. 154(b) by 737 days.

(21) Appl. No.: 17/596,438

(22) PCT Filed: Jun. 3, 2020

(86) PCT No.: PCT/EP2020/065303
§ 371 (c)(1),
(2) Date: Dec. 10, 2021

(87) PCT Pub. No.: WO2020/249438
PCT Pub. Date: Dec. 17, 2020

(65) Prior Publication Data
US 2022/0304256 A1    Sep. 29, 2022

(30) Foreign Application Priority Data
Jun. 10, 2019   (GB) ...................................... 1908216

(51) Int. Cl.
*A01G 20/43*    (2018.01)
*A01D 11/06*    (2006.01)

(52) U.S. Cl.
CPC ............. *A01G 20/43* (2018.02); *A01D 11/06* (2013.01)

(58) Field of Classification Search
CPC . A01G 20/43; A01B 1/04; A01D 7/10; A01D 7/00; A01D 11/06
See application file for complete search history.

(56) References Cited

U.S. PATENT DOCUMENTS

| | | | | |
|---|---|---|---|---|
| 678,519 A | * | 7/1901 | Robinson | A01B 1/222 |
| | | | | 172/373 |
| 2,790,296 A | * | 4/1957 | Bernstein | A01D 7/06 |
| | | | | 294/50.8 |

(Continued)

FOREIGN PATENT DOCUMENTS

| | | | | |
|---|---|---|---|---|
| EP | 2798931 A1 | 11/2014 | | |
| GB | 2095156 A | * | 9/1982 | ........... E01H 1/1206 |

(Continued)

OTHER PUBLICATIONS

International Search Report and Written Opinion, mailed Sep. 24, 2020, in PCT Application No. PCT/EP2020/065303.

*Primary Examiner* — Arpad Fabian-Kovacs
(74) *Attorney, Agent, or Firm* — ArentFox Schiff LLP

(57) ABSTRACT

Device for collecting garden debris from the ground. The device includes a pair of bodies and a pair of handles. Each body defines opposed ends and a collection structure extending at least partially between the ends. The bodies are configured to be pivotally securable to each other about an axis arranged adjacent one of the ends of each body such that the collection structures are opposed and extend substantially radially away from the axis. Each handle is configured to be connected to one of the bodies at a position spaced radially from the axis. Operating the handles causes the bodies to pivot between an open position, to allow dragging the bodies along the ground to gather garden debris between the collection structures, and a closed to allow trapping the gathered garden debris between the bodies.

16 Claims, 8 Drawing Sheets

(56) References Cited

U.S. PATENT DOCUMENTS

| | | | | |
|---|---|---|---|---|
| 2,902,815 A * | 9/1959 | Gallo, Sr. | ................ | A01D 7/10 294/50.8 |
| 3,855,766 A * | 12/1974 | Lutz | ........................ | A01D 7/04 56/400.18 |
| 3,964,775 A * | 6/1976 | Boyd | ........................ | B25B 7/02 294/16 |
| 4,086,750 A * | 5/1978 | White | ...................... | A01D 7/00 56/400.18 |
| 4,514,970 A * | 5/1985 | Wilson | ..................... | A01D 7/00 294/51 |
| 4,991,386 A * | 2/1991 | Dirksen | ................... | A01D 7/00 294/50.8 |
| 5,303,536 A * | 4/1994 | Tolliver | ................... | A01D 7/10 56/400.13 |
| 5,414,982 A * | 5/1995 | Darnell | .................... | A01D 7/04 294/111 |
| 5,440,868 A * | 8/1995 | Darnell | .................... | A01D 7/10 56/400.17 |
| 5,687,556 A * | 11/1997 | Lintz | ........................ | A01D 7/00 56/400.01 |
| 5,927,058 A * | 7/1999 | Hsu | ........................ | A01D 7/10 56/400.17 |
| 6,058,691 A * | 5/2000 | Greeves | ................. | A63B 57/50 56/400.04 |
| 6,101,799 A * | 8/2000 | Darnell | .................... | A01D 7/10 56/400.01 |
| 6,120,073 A | 9/2000 | Jones | | |
| 6,139,077 A * | 10/2000 | Molzan | ............... | E04D 13/0765 294/111 |
| 6,283,521 B1 * | 9/2001 | Agrati | ...................... | A01D 7/04 294/111 |
| 6,336,314 B1 * | 1/2002 | Crevier | ................... | A01D 7/10 294/50.8 |
| 6,339,919 B1 * | 1/2002 | Hsu | ........................ | A01D 7/04 56/400.17 |
| 6,502,381 B2 * | 1/2003 | Crites | ..................... | A01D 7/10 56/400.12 |
| 7,131,255 B1 | 11/2006 | Caneba | | |
| 7,363,755 B1 | 4/2008 | Caneba | | |
| 7,661,258 B1 | 2/2010 | Petruzelli | | |
| 9,611,603 B2 * | 4/2017 | Fernandez, Sr. | ........ | A01B 1/222 |
| 11,229,159 B1 * | 1/2022 | Feldman | .................. | A01D 7/10 |
| 11,723,304 B2 * | 8/2023 | Lyons | ..................... | A01D 7/04 56/400.19 |
| 2004/0088962 A1 * | 5/2004 | Nam | ....................... | A01D 7/00 56/400.12 |
| 2007/0084178 A1 | 4/2007 | Stevens | | |
| 2011/0262260 A1 | 10/2011 | Lee | | |
| 2014/0138110 A1 * | 5/2014 | Corbett | ................... | A01B 1/14 366/129 |
| 2015/0216119 A1 * | 8/2015 | Squires | .................... | A01D 7/10 56/400.04 |
| 2015/0296705 A1 * | 10/2015 | Urrutia | .................... | A01D 7/10 56/400.12 |
| 2018/0020612 A1 * | 1/2018 | Alexander | ............... | A01D 7/10 56/400.12 |
| 2020/0305359 A1 * | 10/2020 | Oakes | .................... | A01G 20/43 |
| 2022/0248598 A1 * | 8/2022 | Besler | ..................... | A01D 7/10 |

FOREIGN PATENT DOCUMENTS

| | | | | |
|---|---|---|---|---|
| GB | 2217974 A | * | 11/1989 | ........... E01H 1/1206 |
| GB | 2217974 B | * | 4/1992 | ........... E01H 1/1206 |
| JP | 2000316407 A | * | 11/2000 | ........... E01H 1/1206 |
| JP | 3225462 B2 | * | 11/2001 | ........... E01H 1/1206 |
| WO | WO-02102137 A1 | * | 12/2002 | ............... A01D 7/10 |
| WO | 2011/116789 A1 | | 9/2011 | |
| WO | WO-2017045054 A1 | * | 3/2017 | ............... A01B 1/14 |

* cited by examiner

DEVICE FOR COLLECTING GARDEN DEBRIS

CROSS-REFERENCE TO RELATED APPLICATIONS

This application is a National Phase of PCT Application No. PCT/EP2020/065303, filed Jun. 3, 2020, which claims the benefit of GB Application No. 1908216.3, filed Jun. 10, 2019, the disclosures of each of which are hereby incorporated by reference in their entireties.

TECHNICAL FIELD

The present disclosure relates generally to devices for collecting garden debris, such as leaves, twigs, or the like, from the ground.

BACKGROUND

Gardeners frequently collect garden debris, such as leaves, twigs, hedge clippings, and the like, which has fallen to the ground. Removal of such debris is required as it is considered unsightly and sometimes necessary to prevent the debris from decaying and damaging the ground, and/or becoming a trip hazard. For example, fallen leaves are frequently removed from lawns to prevent the leaves from damaging the grass.

A wide range of devices exist to assist with collecting garden debris. Rakes are commonly used to manually gather garden debris into a pile which is then lifted, typically by hand, into a receptacle, such as a bin, to remove the debris. Leaf scoops, being a pair of shells worn over each of a user's hands, are sometimes used to assist with lifting the debris from the ground to the receptacle. However this approach requires a user to use two tools, or discard the rake to use its hands, either of which is inconvenient and time consuming. This can also involve a user assuming awkward positions, such as stooping, which can cause injury or is prohibitive for less able bodies users.

Leaf vacuums are a powered alternative for collecting garden debris. Such devices generate a stream of air to cause the garden debris to be sucked into a receptacle, typically being a bag. However these devices are often heavy, require fuel or an electrical power supply, and emit an undesirable volume of noise.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to at least one disclosed embodiment, there is provided a device for collecting garden debris from the ground, the device including a pair of bodies and a pair of handles. Each body defines opposed ends and a collection structure extending at least partially between the ends. The bodies are pivotally securable to each other about an axis arranged adjacent one of the ends of each body such that the collection structures are opposed and extend substantially radially away from the axis. Each handle is configured to be connected to one of the bodies at a position spaced radially from the axis. In use, operating the handles causes pivoting of the bodies about the axis between an open position, to allow dragging the bodies along the ground to gather garden debris between the collection structures, and a closed position, to allow trapping the garden debris between the bodies.

Each handle may include an elongate member securable to one of the bodies to extend substantially parallel to the axis. Each elongate member may define a free end and is configured such that, in use, the free ends are arranged to inhibit colliding with each other.

Each handle may include a grip configured to extend substantially perpendicular to the axis. The grip may be connected to the associated body to be spaced away from the body in a direction substantially parallel to the axis.

The device may also include an adjustment mechanism operable to adjust a spacing of the grip from the body.

Each grip may be associated with a brace structure configured to, in use, partially surround and abut a user's arm.

Each handle may be configured to be connected at a rear of the body.

Each handle may be integrally formed with one of the bodies.

Each collection structure may include a ramped portion, and the ramped portions are configured such that, in the closed position, the ramped portions define a valley therebetween. Each ramped portion may be substantially planar.

Each collection structure may include an array of resiliently deformable tines. In such embodiments, the tines in each array may extend parallel to each other and towards the end of the body securable adjacent the axis.

The tines of one body may be arranged to be offset from the tines of the other body to allow interlacing of the tines in the closed position.

Each collection structure may define a recess configured to receive the garden debris. Each recess may be shaped to slope inwards towards the end of the body securable adjacent the axis.

Each recess may define a substantially continuous rim configured such that, in use, the rims are arrangeable adjacent to each other to trap the debris in the recesses.

Also disclosed is a method for collecting garden debris from the ground with a device, the method including: moving a pair of handles relative to each other, the handles secured to a respective pair of bodies of the device, to cause pivoting of at least one of the bodies about an axis arranged at a complementary end of each of the bodies, wherein each handle is connected to one of the bodies to be spaced radially from the axis; moving the handles to drag the bodies along the ground to gather garden debris between opposed ramped portions defined by the bodies; and moving the handles relative to each other to pivot at least one of the bodies about the axis to trap the garden debris between the bodies.

The method may also include: moving the handles to lift the bodies, containing the trapped garden debris, above a receptacle; and moving the handles to pivot at least one of the bodies about the axis to allow the trapped garden debris to fall into the receptacle.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompany drawings in which.

DESCRIPTION OF EMBODIMENTS

Figure 1:
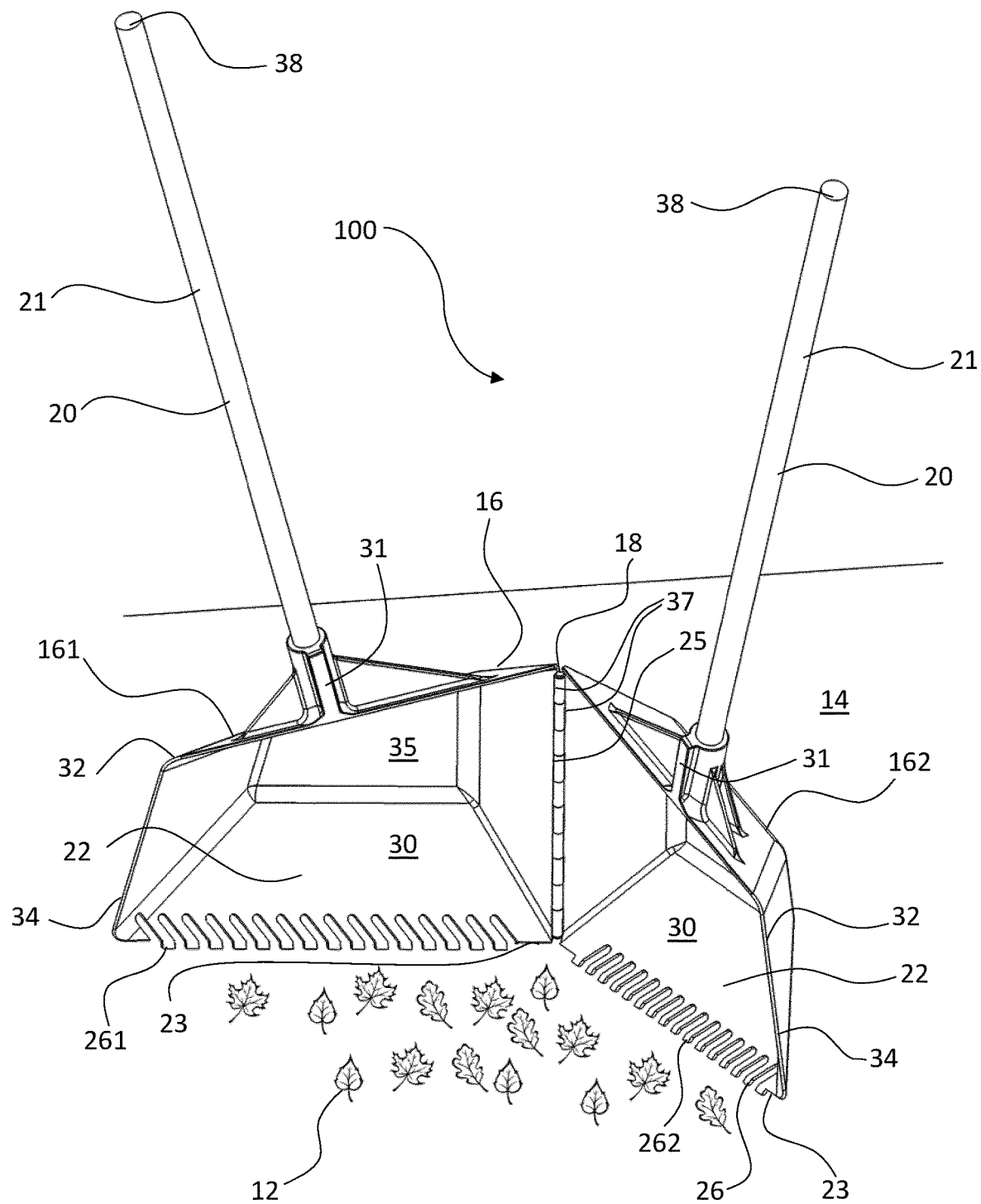
FIGS. 1 and 2 are front and rear perspective views, respectively, of a first embodiment of a device for collecting garden debris arranged on the ground, the device arranged in an open position to gather the debris.
Figure 2:
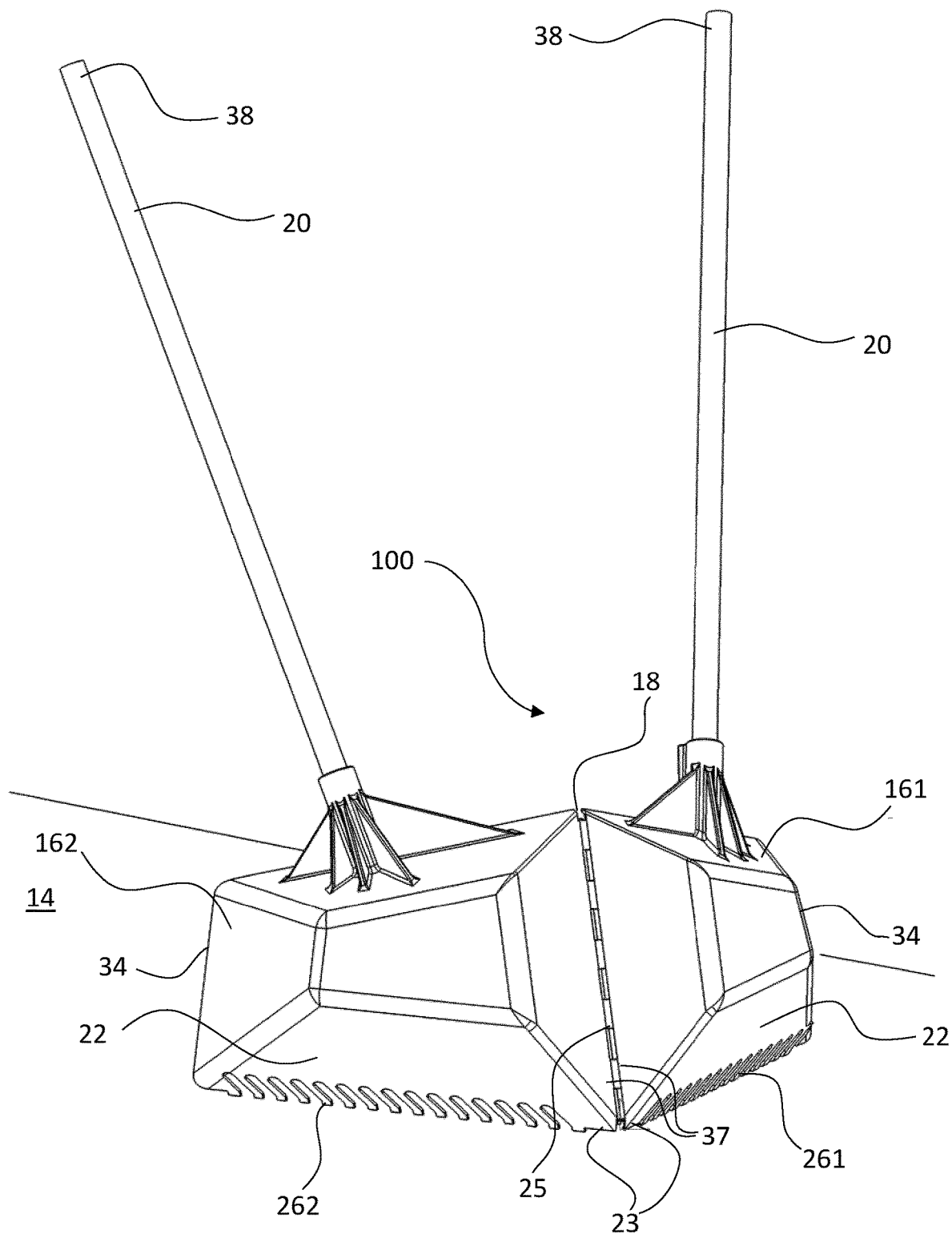
Figure 3:
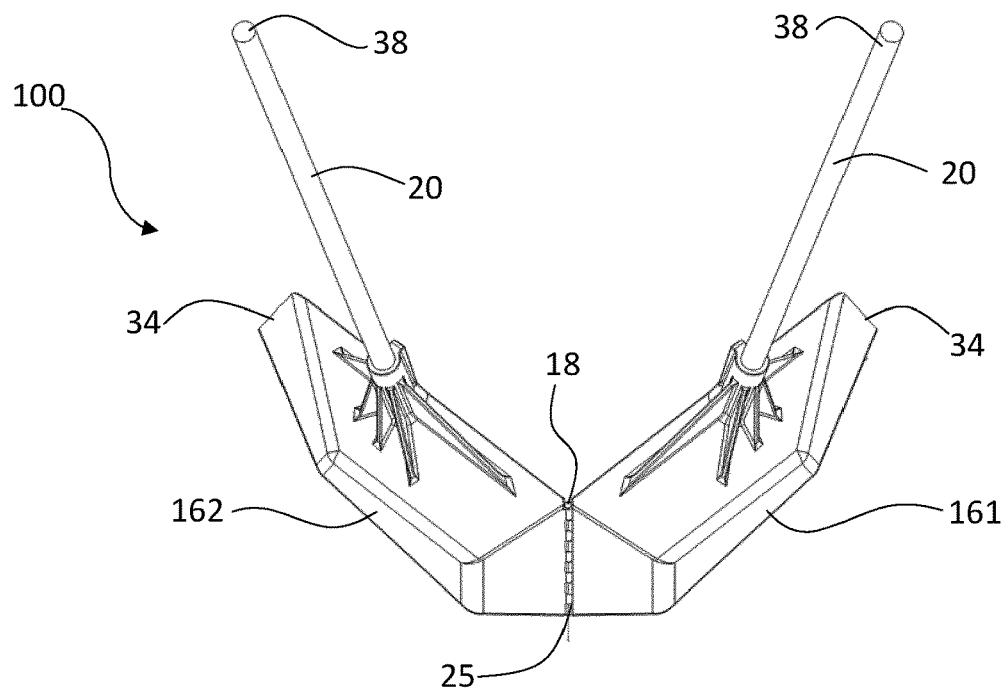
FIG. 3 is a top view of the device shown in the previous figures.

In the drawings, reference numeral 10 generally designates a device 10 for collecting garden debris 12 or similar loose, light-weight items, such as litter, golf balls, and the like, from the ground 14. The device 10 includes a pair of bodies 16 and a pair of handles 21. Each body 18 defines opposed ends 34, 37 and a collection structure extending at least partially between the ends 34, 37. The bodies 18 are configured to be pivotally securable to each other about an axis 18 arranged adjacent one of the ends 37 of each body 18 such that the collection structures are opposed and extend substantially radially away from the axis 18. Each handle 21 is configured to be connected to one of the bodies 16 at a position spaced radially from the axis 18.

In use, operating the handles 21 causes the bodies 16 to pivot between an open position (FIG. 1), where the bodies 16 are pivoted apart, and a closed position (FIG. 5), where the bodies 16 are adjacent to each other. Pivoting the bodies 16 to the open position allows dragging the bodies 16 along the ground to gather garden debris 12 between the collection structures, and pivoting the bodies 16 to the closed position allows trapping the gathered garden debris 12 between the bodies 16.

Figure 4:
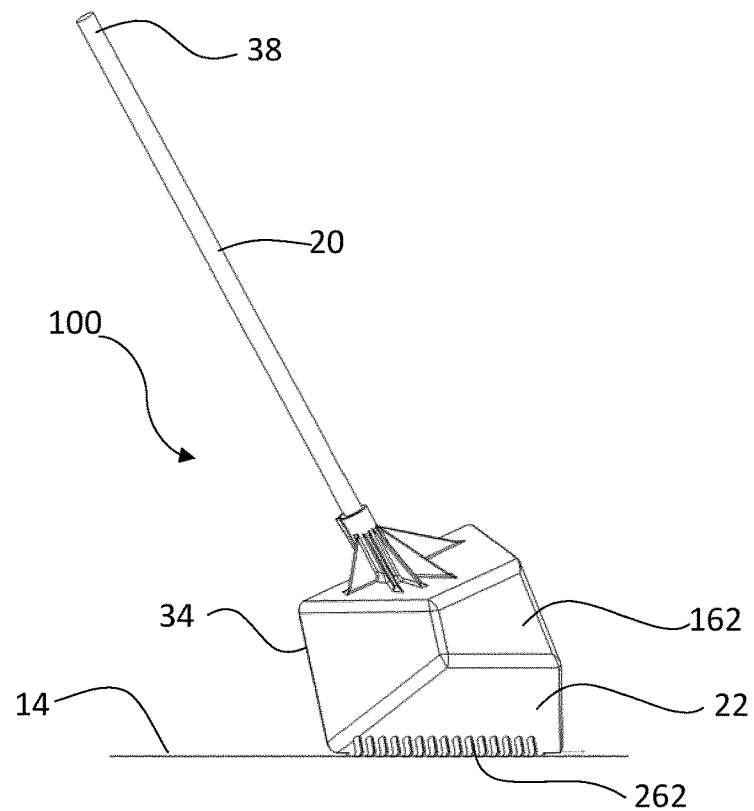
FIG. 4 is a side view of the device shown in the previous figures.
Figure 5:
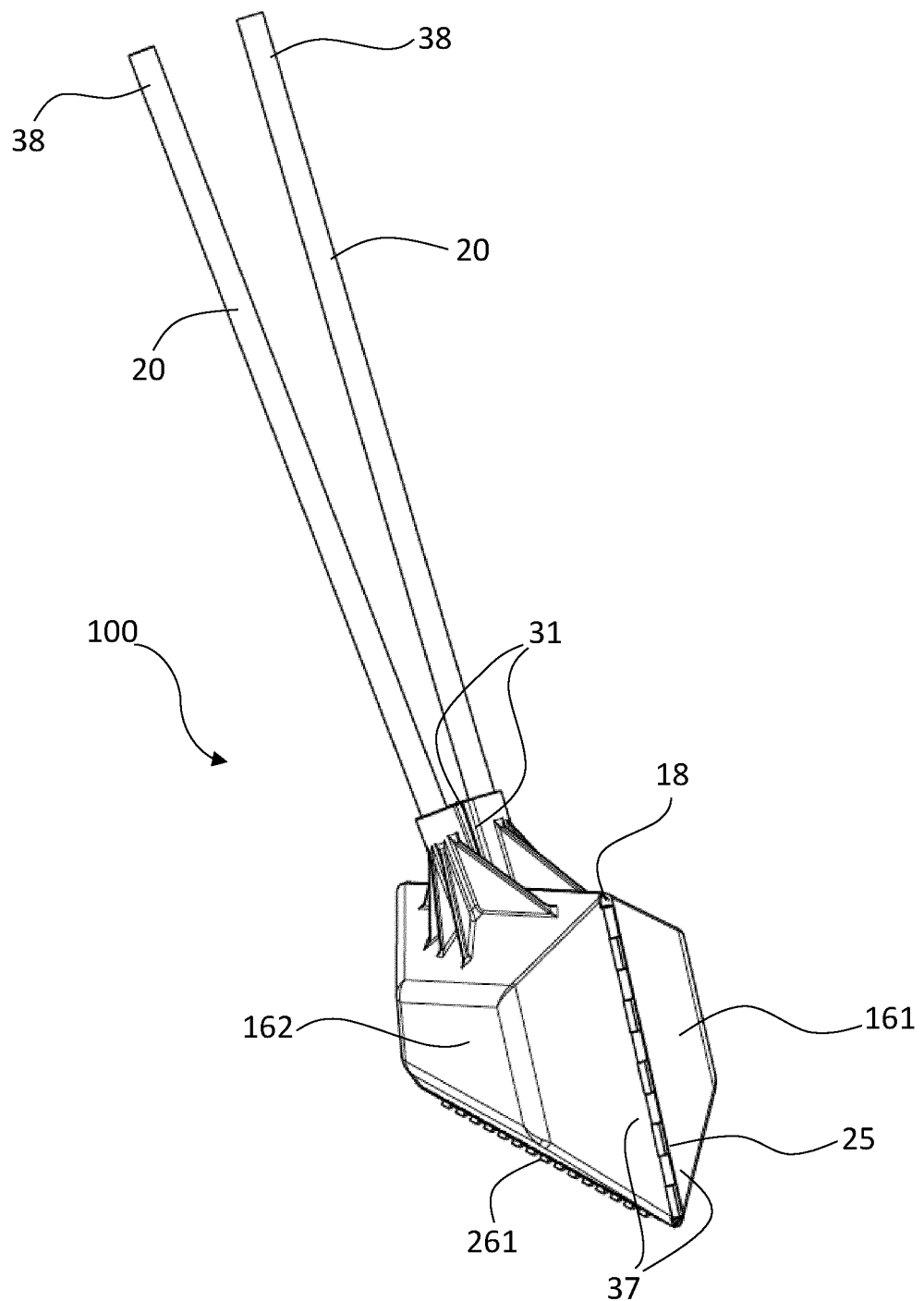
FIG. 5 is a rear perspective view of the device shown in the previous figures, the device arranged in a closed position to collect the debris.
Figure 6:
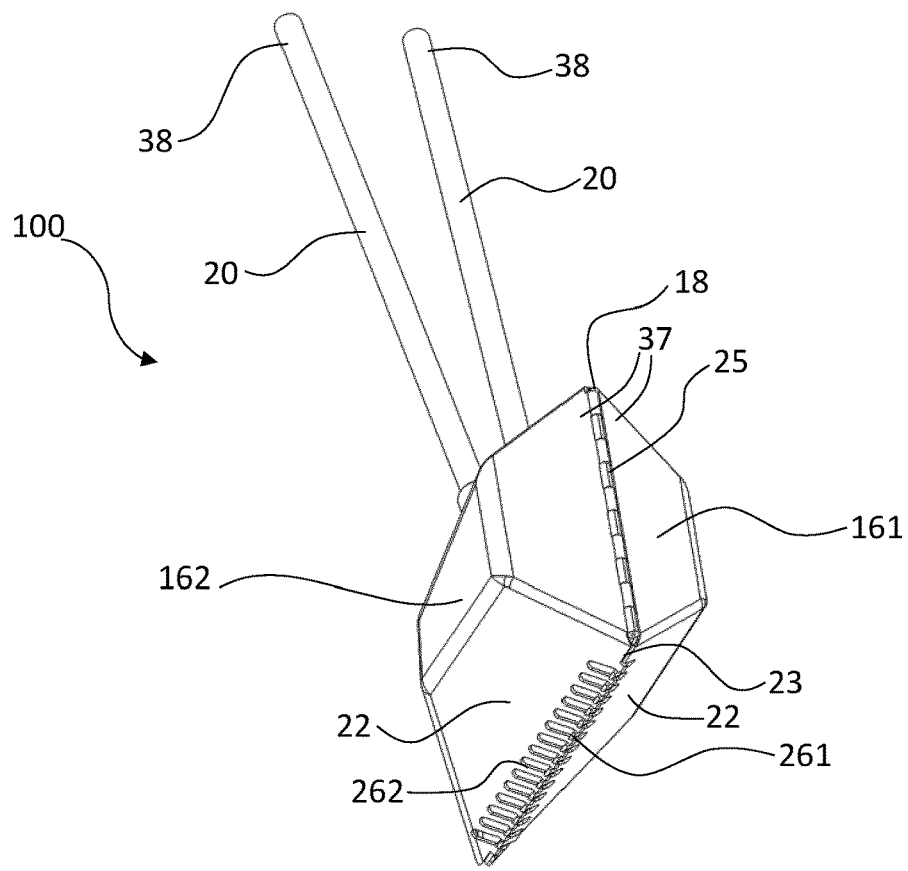
FIGS. 6 and 7 are underside perspective and detailed views, respectively, of the device shown in the previous figures.
Figure 7:
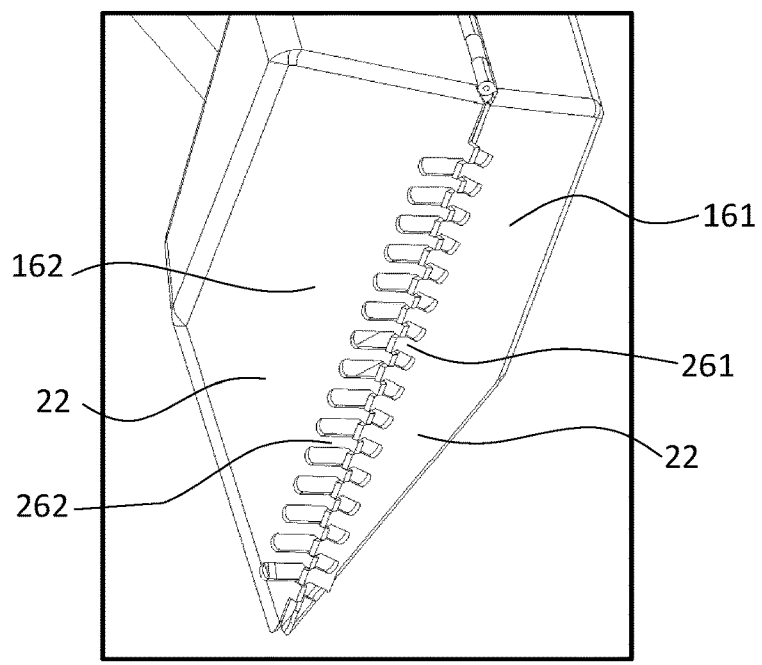

FIGS. 1 to 7 show a first embodiment 100 of the device 10. FIGS. 1 to 4 show the device 10 arranged in the open position, where the bodies 16 are pivoted apart, to allow gathering the garden debris 12 between the bodies 16. FIGS. 5 to 7 show the device arranged in the closed position, where the bodies 16 are pivoted together, to allow trapping the garden debris 12 between the bodies 16.

In the embodiment illustrated in FIGS. 1 to 7, the bodies 16 are in the form of opposed shells comprising a left shell 161 and a right shell 162. The shells 161, 162 are securable to each other at a hinge 25 to allow pivoting about the axis 18 arranged adjacent the ends 37. In the illustrated embodiment the end 37 of each shell 161, 162 defines part of a hinge 25 to arrange the axis immediately adjacent the ends 37. In other embodiments (not shown), the hinge is a separate assembly securable to the shells 161, 162 and/or axis 18 is arranged to be spaced from the ends 37. In some embodiments, the hinge 25 includes a pin (not shown) retained within a central aperture defined by each of the shells 161, 162 to secure the left shell 161 to the right shell 162.

Best shown in FIG. 6, the collection structures of the shells 161, 162 include ramped portions 22 configured to be oppositely inclined such that in the closed position the ramped portions 22 incline away from each other to define a valley therebetween. Configuring the ramped portions 22 in this way advantageously encourages the garden debris 12 to ride up the ramped portions 22 when the shells 161, 162 are dragged along the ground 14, consequently facilitating collecting the debris 12 from the ground 14.

The ramped portions 22 are shaped to be substantially planar and arranged to extend radially from the axis 18. In other embodiments (not shown) the ramped portions 22 are discontinuous and define a notional plane extending away from the axis 18, and/or define a curved region or surface extending away from the axis 18, such as a scoop or bucket.

Each collection structure includes an array of tines 26 arranged along a base edge 23 of the ramped portion 22. The tines 26 in each array extend parallel to each other and towards the end 37 of the shell 161, 162 arranged adjacent the axis 18. The tines 26 are resiliently deformable, being at least partially formed from a flexible material.

The arrangement and configuration of the tines 26 allows the tines 26 to flex when the shells 161, 162 are dragged along the ground 14. This allows the tines 26 to ride over irregular surfaces, such as is common in lawns and the like. Best shown in FIG. 7, each tine 26 defines a free end which is slightly angled to enhance this effect. In other embodiments (not shown), the tines 26 are absent and instead the ramped portions 22 define a continuous base edge 23 forming a blade-like structure. Such embodiments are useful to facilitate collecting garden debris 12 from hard surfaces, such as patios, walkways or roads. In yet other embodiments (not shown), the tines 26 are substituted with teeth to allow collecting substantial debris, such as rubble in a construction site.

In the illustrated embodiments each array of tines 26 extends along a portion of the associated base edge 23. In other embodiments (not shown), the tines 26 are arranged along the entire base of the body 16. In further embodiments (not shown), the collection structure comprises only the array of tines 26. For example, in some embodiments (not shown) each body 16 includes a shaft arranged to extend radially from the axis 18 and the array of tines 26 extends angularly from the shaft.

Best shown in FIG. 7, the tines 261 of the left body 161 are arranged to be offset from the tines 262 of the right body 162. This allows interlacing of the arrays of tines 261, 262 when the shells 161, 162 are arranged in the closed position. This configuration inhibits the arrays of tines 261, 262 interfering with each other during use. The tines 261, 262 in each array are spaced relative to the other array sufficiently to provide a clearance between the arrays in the closed position. This arrangement avoids debris 12 being trapped between tines 261, 262.

Each collection structure of each shell 161, 162 defines a recess 30 arranged to receive collected garden debris 12. Each ramped portion 22 forms a side of one of the recesses 30. In the illustrated embodiment, each shell 161, 162 defines the recess 30 within a continuous, planar rim 32. This means that when the shells 161, 162 are pivoted to the closed position, the rims 32 of the shells 161, 162 are arranged adjacent to each other to form a substantially enclosed volume able to securely trap the debris 12 within the shells 161, 162. In some embodiments (not shown), the collection structure is configured to comprise a container defining the recess 30 and having no ramped portion 161, 162. Such embodiments can be useful, for example, for collecting litter from hard surfaces. In such embodiments the ramped portion 22 is optionally securable along an operatively front edge of the container.

Each rim 32 defines an abutment surface 31 arranged to abut the other abutment surface 31 in the closed position to provide a stop to control the relative positions of the shells 161, 162. It will be appreciated that in alternative embodiments (not shown), the rims 32 may be non-planar and/or discontinuous meaning that in the closed position the shells 161, 162 define a partially enclosed volume, for example, defining an open-topped cavity.

Each shell 161, 162 defines a free end 34 configured to be arranged distally from the axis 18 and is configured so that the recess 30 slopes inwards from the free end 34. This means that the recess 30 defines a deeper region close to the axis 18 and is gradually shallower towards the free end 34. This provides a greater volume for the debris 12 to collect in during use of the device 10 as the debris 12 is inherently forced towards the end 37 of the shells 161, 162 adjacent the axis 18.

Each shell 161, 162 defines a solid wall 35 at a rear of the recess 30 to optimise retaining collected debris 12 within the recess 30. In alternative embodiments (not shown) the wall 35 is perforated, or formed from a mesh, to allow fine debris to pass out of the recess 30. This arrangement is useful where the device 10 is employed to collect debris 12 from fine, loose ground surfaces, such as sand or gravel, where filtering the loose ground material out of the debris 12 is required.

In the embodiment shown in FIGS. 1 to 7, each handle 21 includes an elongate member, in the form of a shaft 20, securable to one of the shells 161, 162 to be spaced radially away from the axis 18 and to extend substantially parallel to the axis 18. Arranging the shafts 20 in this way enhances leverage to manoeuvre and pivot the shells 161, 162. It will be appreciated that this includes arranging the shafts 20 to extend slightly transverse to the axis 18, for example, at 1-10O relative to the axis 18, to be tilted towards the free ends 34 of the shells 161, 162.

Each shaft 20 is directly connected to one of the shells 161, 162. Relative movement of the shafts 20 causes pivoting of the shells 161, 162, for example, between the open and closed positions.

Best shown in FIG. 4, each shaft 20 is securable to the shell 161, 162 to be angled slightly towards the free ends 34 of the shells 161, 162. This conveniently locates a free end 38 of each shaft 20 to facilitate dragging the ramped portions 22 along the ground 14 in a direction towards the user.

Best shown in FIG. 5, the shafts 20 are arranged so that, in the closed position, the free ends 38 are spaced apart from each other. This configuration inhibits the free ends 38 colliding consequently avoiding a user's hands, gripping the free ends 38, from colliding during use.

In alternative embodiments (not shown), each handle 21 includes an elongate member configured to extend along a rear portion of the associated shell 161, 162 to the axis 18 to pivotally connect to the other handle 21. For example, each handle 21 may be formed from bent tubular metal and include an eyelet at an end to allow connecting the eyelets to form part of the hinge 25. This is useful to enhance rigidity of the shells 161, 162, and/or strengthen the hinge 25.

Figure 8:
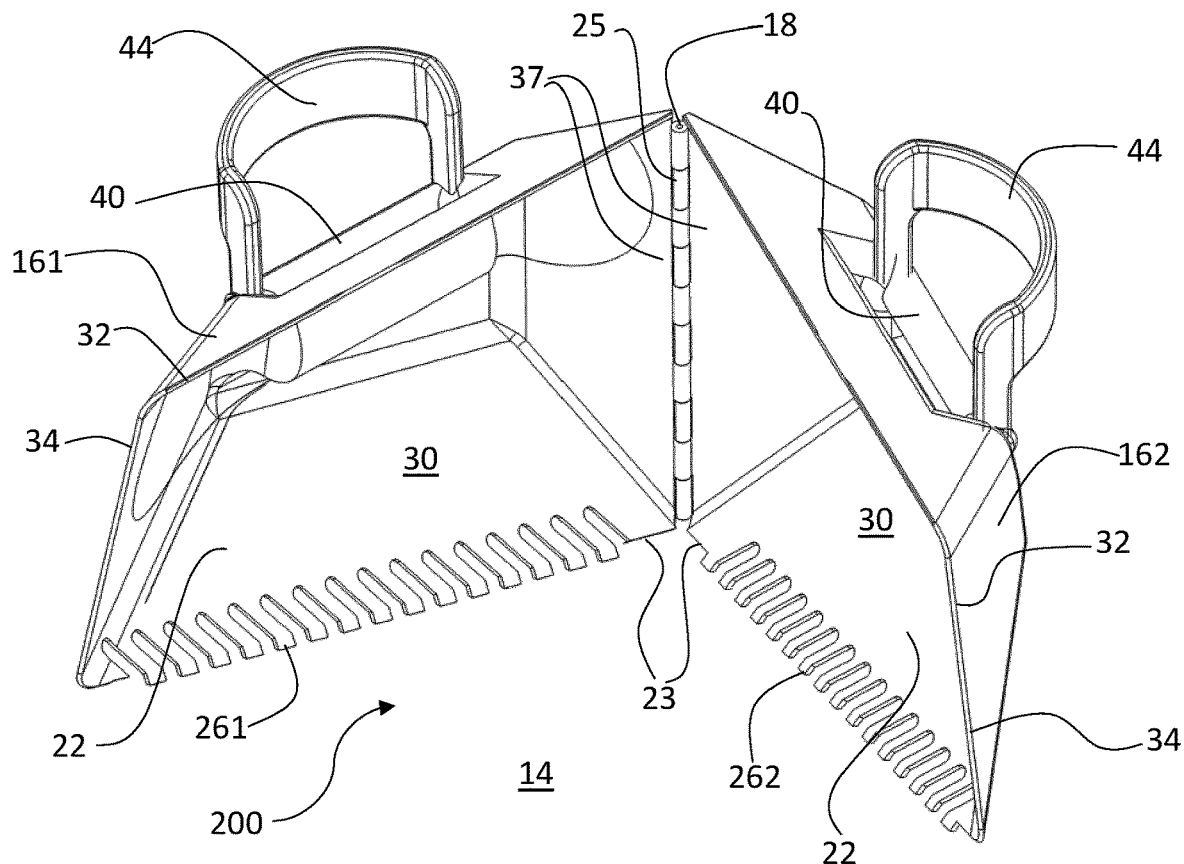
FIGS. 8 and 9 are front and rear perspective views, respectively, of a second embodiment of a device for collecting garden debris, the device arranged in an open position to collect the debris.
Figure 9:
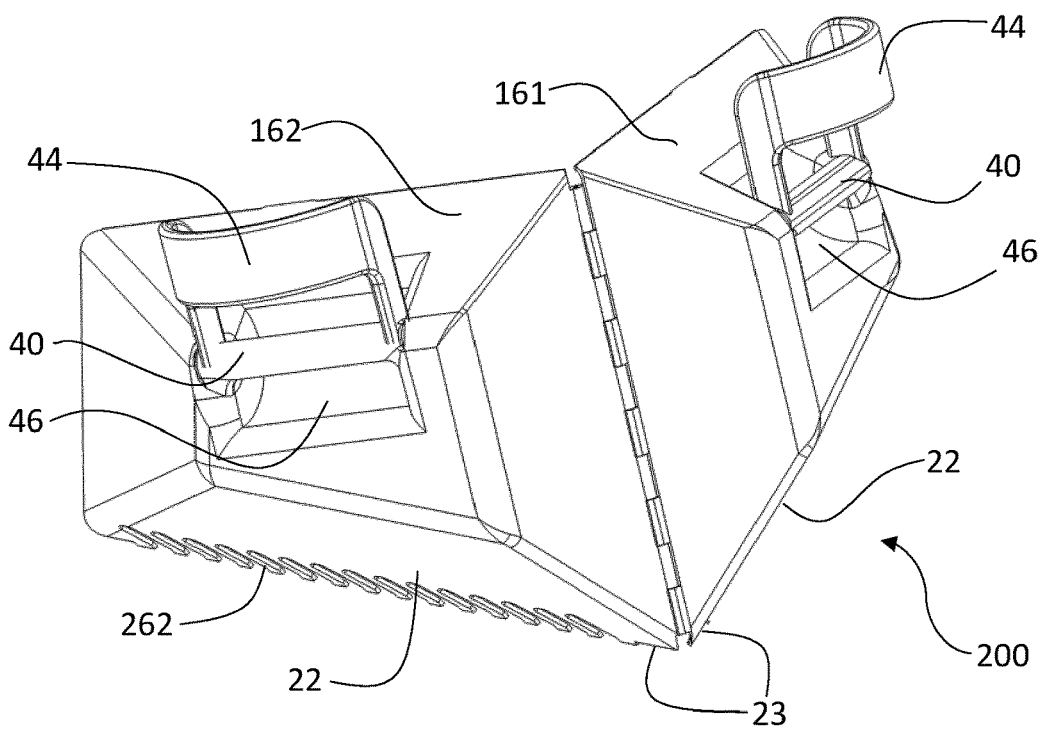

FIGS. 8 and 9 show a second embodiment 200 of the device 10. This embodiment 200 shares features with the first embodiment 100, whereby common reference numerals indicate common features.

In the embodiment illustrated in FIGS. 8 and 9, the handle 21 includes a grip 40 configured to extend substantially perpendicular to the axis 18. Each grip 40 is integrally formed in a rear of the shell 161, 162 and spaced radially away from the axis 18. In other embodiments (not shown), the grip 40 is a separate component configured to be mounted to the rear of the shell 161, 162. In yet other embodiments (not shown), the grip 40 is covered with a layer of tacky material, such as a low shore hardness elastomer, to enhance friction between the grip 40 and a user.

Each grip 40 is associated with a brace structure 44 arranged to extend from the shell 161, 162 to allow partially surrounding and abut a user's arm during use to assist the user controlling movement of the shells 161, 162. Each shell 161, 162 defines a second recess 46 adjacent the grip 40 to provide space for a user's fingers when gripping the grip 40.

Figure 10:
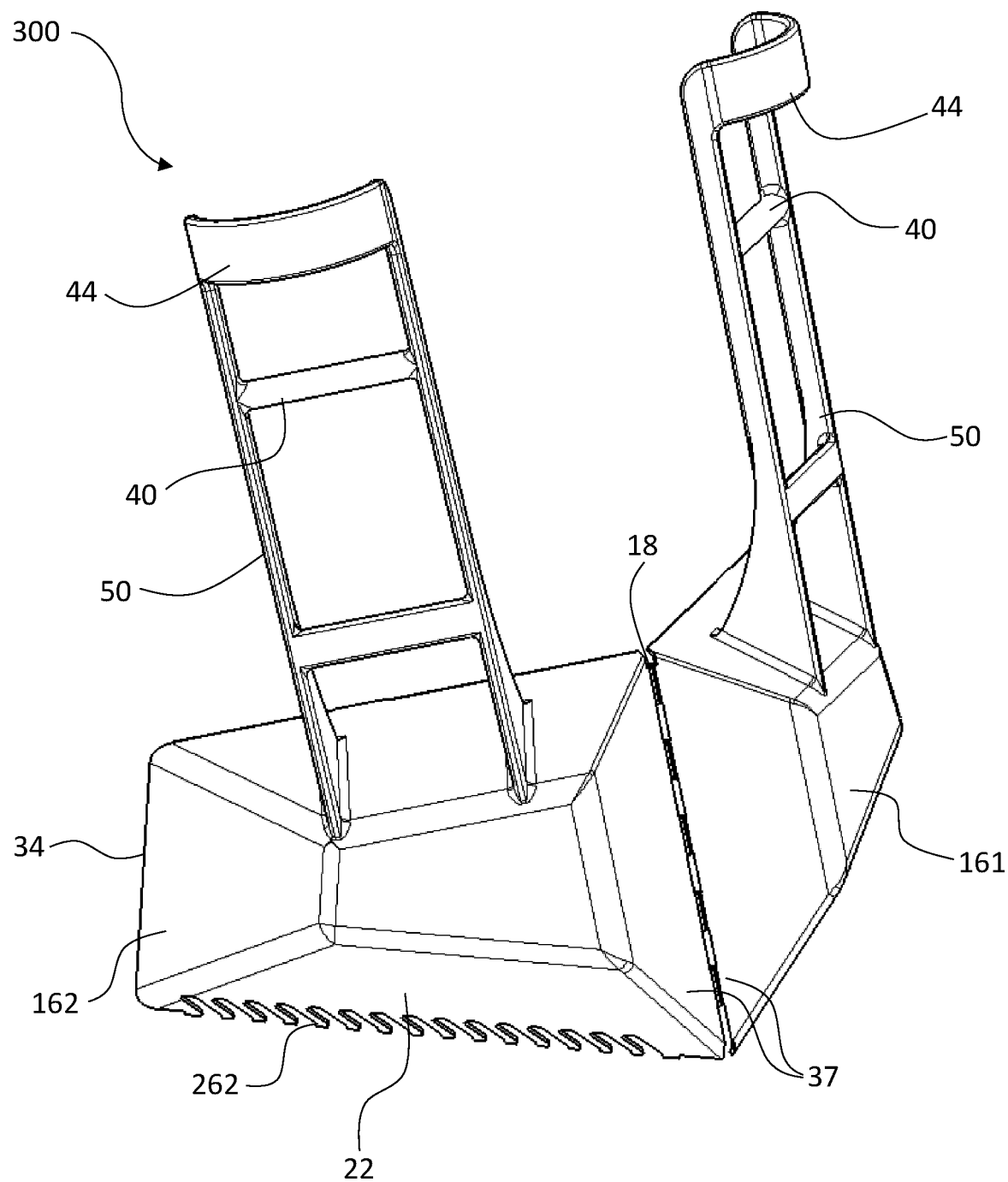
FIG. 10 is a perspective view of a third embodiment of a device for collecting garden debris.

FIG. 10 shows a third embodiment 300 of the device 10. This embodiment 300 shares features with the first embodiment 100 and second embodiment 200, whereby common reference numerals indicate common features.

In the embodiment illustrated in FIG. 10, each grip 40 and brace structure 44 are connected to one of the shells 161, 162 to be spaced from shell 161, 162 in a direction substantially parallel to the axis 18. This arrangement ergonomically positions the grips 40 and can enhance control of movement of the shells 161, 162, by the user, during use. In the illustrated embodiment, each grip 40 is fixedly secured by a support structure 50 relative to the associated shell 161, 162 to define a static separation distance. In other embodiments (not shown), the grip 40 is connected to the associated shell 161, 162 by an adjustment mechanism operable to allow adjusting the separation distance. In such embodiments the adjustment mechanism includes telescopic elements to allow moving the grip 40 towards and away from the associated shell 161, 162.

Figure 11A:
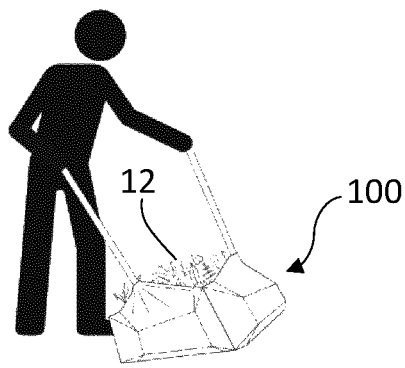
FIGS. 11A to 11C illustrated stages of using the device shown in FIGS. 1 to 7.
Figure 11B:
Figure 11C:
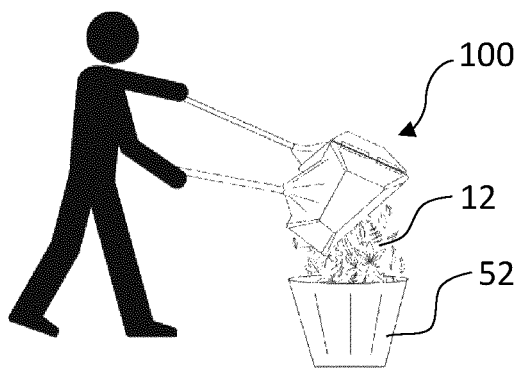

Use of the device 100 is illustrated in FIGS. 11A to 11C. This involves a user standing next to the device 100, gripping each of the shafts 20 and moving the shafts 20 apart to cause the shells 161, 162 to pivot to the open position. By manipulating the shafts 20, the user urges each ramped portion 22 towards the ground 14 and drags the shells 161, 162 towards itself. During this action, when the ramped portions 22 collide with garden debris 12 on the ground 14 this causes the debris 12 to gather between the ramped portions 22 and ride up the ramped portions 22, towards the axis 18. Continued dragging of the shells 161, 162 along the ground 14 in this way causes the debris 12 to gather in a pile between the ramped portions 22 (FIG. 11A). The user then moves the shafts 20 towards each other to cause the shells 161, 162 to pivot to the closed position. This causes the pile of debris 12 to ride up the ramped portions 22 and into the recesses 30 to be trapped within the shells 161, 162 (FIG. 11B). The user then manipulates the shafts 20 to lift the shells 161, 162 to an appropriate disposal location, often being above a receptacle, such as a bin 52 or bag, and moves the shafts 20 apart to pivot the shells 161, 162 away from each other, releasing the debris 12 into the receptacle (FIG. 11C).

Use of the device 200 and 300 is the same as described above, with respect to the device 100, but instead of the user moving the shafts 20 to cause pivoting and movement of the shells 161, 162 the user holds and manipulates the grips 40 to achieve this. It will be appreciated that use of the device 200, 300 requires a different user body position than is employed with respect to the device 100 as the user is required to stoop to apply force to the shells 161, 162 towards the ground 14 at the same time as dragging the shells 161, 162 towards itself to gather the debris 12 between the ramped portions 22. This means that these embodiments 200, 300 are generally only suitable for able-bodied users who understand how to avoid injury.

The device 10 advantageously allows a user to efficiently and ergonomically gather and remove garden debris 12, or other similar light-weight material such as litter, from the ground 14 using a single tool. This is enabled by operating the pair of handles 21 to pivot the bodies 16 about the axis 18 to the open position, dragging the bodies 16 along the ground 14 to gather the debris 12 between the collection structures, and operating the pair of handles 21 to pivot the bodies 16 about the axis 18 to the closed position to trap the debris 12 between the bodies 16. The bodies 16, containing the debris 12, may then be moved to above a receptacle or other convenient disposal location and pivoted apart to release the debris 12.

The arrangement of each handle 21 relative to the associated body 16 to be spaced radially from the axis 18 enhances ease of use as this provides effective leverage for pivoting the bodies 16 between the open and closed positions. Furthermore, this arrangement ergonomically positions the handles 21 to allow dragging the bodies 16 along the ground to collect debris between the collection structures.

Use of the device 10 allows a user to trap the debris 12 between the bodies 16 and remove the debris to an appropriate location, such as a receptacle, at frequent intervals whilst operating the device 10. This usefully prevents large piles of debris 12 building up which can be difficult to dispose of. Similarly, frequent removal of debris 12 during a collection exercise enhances efficient operation in adverse weather conditions, such as high winds.

Use of the device 100 reduces or avoids a user having to stoop or assume an awkward position to lift garden debris 12 from the ground 14. This is particularly advantageous for users with a limited range of movement, such as elderly persons.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A device for collecting garden debris from the ground, the device including:
   a pair of bodies, each body defining a base between opposed ends, and a collection structure extending at least partially along the base, the bodies pivotally secured to each other about an operatively vertical pivot axis arranged at one of the ends of each body, the collection structures being opposed and extending substantially radially away from the pivot axis; and
   a pair of separate, disconnected handles, each handle comprises an elongate member defining a longitudinal axis along its length and connected to one of the bodies at a position spaced radially from the vertical pivot axis, the elongate member arranged having its longitudinal axis extending substantially parallel to the vertical pivot axis, whereby the elongate members are graspable by a user standing upright concurrent with arranging the collection structures on the ground,
   whereby, in use, manipulating the handles, by the user, causes pivoting of the bodies about the vertical pivot axis between an open position to drag the collection structures along the ground towards the user to gather garden debris between the collection structures, and a closed position to trap the garden debris between the bodies.

2. The device according to claim 1, wherein each elongate member defines a free end, and each elongate member is connected to the body to inhibit the free ends colliding with each other in the closed position.

3. The device according to claim 1, wherein each handle is configured to be connected at a rear of the body.

4. The device according to claim 1, wherein each handle is integrally formed with one of the bodies.

5. The device according to claim 1, wherein each collection structure includes a ramped portion, the ramped portions configured to define a valley therebetween in the closed position.

6. The device according to claim 5, wherein each ramped portion is substantially planar.

7. The device according to claim 1, wherein each collection structure includes an array of resiliently deformable tines.

8. The device according to claim 7, wherein the tines in each array extend parallel to each other and towards the end of the body adjacent the vertical pivot axis.

9. The device according to claim 7, wherein the tines of one body are arranged to be offset from the tines of the other body to allow interlacing of the tines in the closed position.

10. The device according to claim 1, wherein each collection structure defines a recess configured to receive the garden debris.

11. The device according to claim 10, wherein each recess is shaped to slope inwards towards the end of the body adjacent the vertical pivot axis.

12. The device according to claim 10, wherein each recess defines a substantially continuous rim, wherein the rims are arranged adjacent to each other in the closed position to trap the debris in the recesses.

13. The device according to claim 1, wherein each collection structure includes a ramped portion and an array of tines extending from the ramped portion, the ramped portions configured such that, in the closed position, the ramped portions define a valley therebetween.

14. The device according to claim 1, wherein each elongate member extends from the associated body at a non-perpendicular angle to the base of the body and toward the end of the associated body that is opposite the axis.

15. A method for collecting garden debris from the ground with a device, the method including:
   moving a pair of separate, disconnected handles relative to each other about | an operatively vertical pivot axis, wherein each handle comprises an elongate member arranged to extend substantially parallel to the vertical pivot axis and is secured to one of a pair of bodies of the device hingedly connected to each other about the vertical pivot axis, whereby moving the handles causes pivoting of the bodies about the vertical pivot axis, wherein each elongate member is connected to one of the bodies a position spaced across the body, radially from the pivot axis, the handles positioned for gripping by a user, to arrange the bodies on the ground while the user is standing upright;
   moving the handles to drag the bodies along the ground and towards the user to gather garden debris between opposed ramped portions defined by the bodies; and moving the handles to pivot the bodies towards each other about the vertical pivot axis to a closed position to trap the garden debris between the opposed ramped portions.

16. The method according to claim 15, wherein the method also includes:
moving the handles to lift the bodies, containing the trapped garden debris, above a receptacle; and
moving the handles to pivot at least one of the bodies about the axis to allow the trapped garden debris to fall into the receptacle.

* * * * *